(12) United States Patent
Adams et al.

(10) Patent No.: US 6,422,733 B1  
(45) Date of Patent: Jul. 23, 2002

(54) INTERNAL MIXER WITH WIDE THROAT AND WEAR PLATES

(75) Inventors: James Richard Adams, Louisville; William Jackson Cain, Akron; Robert Mark Felitsky; William Arthur Watts, both of Uniontown, all of OH (US)

(73) Assignee: The Goodyear Tire & Rubber Co., Akron, OH (US)

( * ) Notice: Subject to any disclaimer, the term of this patent is extended or adjusted under 35 U.S.C. 154(b) by 0 days.

(21) Appl. No.: 09/530,055

(22) PCT Filed: Jan. 5, 1998

(86) PCT No.: PCT/US98/00056
§ 371 (c)(1),
(2), (4) Date: Apr. 20, 2000

(87) PCT Pub. No.: WO99/34964
PCT Pub. Date: Jul. 15, 1999

(51) Int. Cl.[7] ............................................. B29B 7/24
(52) U.S. Cl. ............................................................ 366/76.7
(58) Field of Search ........................ 366/76.1, 76.7, 366/76.08, 76.9, 76.93, 83–85, 297–301; 425/204, 208, 209

(56) References Cited

U.S. PATENT DOCUMENTS

| | | | |
|---|---|---|---|
| 1,279,220 A | * | 9/1918 | Banbury |
| 1,370,398 A | * | 3/1921 | Banbury |
| 1,396,138 A | * | 11/1921 | Mosher |
| 1,516,488 A | * | 11/1924 | Banbury |
| 1,520,001 A | * | 12/1924 | Banbury |
| 1,523,387 A | * | 1/1925 | Banbury |
| 1,905,755 A | * | 4/1933 | Schnuck et al. |
| 1,938,377 A | * | 12/1933 | Ducharme et al. |
| 2,985,909 A | * | 5/1961 | Smith et al. |
| 3,468,518 A | * | 9/1969 | Koch |
| 3,572,645 A | * | 3/1971 | Matsuoka |
| 4,053,144 A | | 10/1977 | Ellwood |
| 4,058,297 A | * | 11/1977 | Seufert ........................ 366/81 |
| 4,234,259 A | * | 11/1980 | Wiedmann et al. ........... 366/85 |
| 4,512,664 A | * | 4/1985 | Oiwa |
| 4,620,793 A | * | 11/1986 | Bell |
| 4,775,240 A | * | 10/1988 | Passoni ....................... 366/85 |
| 4,830,506 A | | 5/1989 | Borzenski |
| 4,877,328 A | * | 10/1989 | Muller et al. |
| 5,061,078 A | * | 10/1991 | Yada |
| 5,324,107 A | * | 6/1994 | Tanaka et al. |
| 5,492,403 A | | 2/1996 | Metcalf et al. |
| 5,529,390 A | * | 6/1996 | Giani et al. ................ 366/76.7 |

FOREIGN PATENT DOCUMENTS

| | | | |
|---|---|---|---|
| JP | 60-209231 | * | 10/1985 |
| JP | 61-291027 | * | 12/1986 |

* cited by examiner

Primary Examiner—Charles E. Cooley  
(74) Attorney, Agent, or Firm—Frederick K. Lacher; Bruce J. Hendricks

(57) ABSTRACT

A wide throat internal mixer and method of mixing a batch of petrochemical material wherein bales are fed by a corresponding large size ram weight from a large size hopper into a mixing chamber through a corresponding large size throat opening having wear plates.

11 Claims, 2 Drawing Sheets

INTERNAL MIXER WITH WIDE THROAT AND WEAR PLATES

TECHNICAL FIELD

This invention relates to high intensity mixing machines for elastomeric materials. A batch of ingredients including carbon black is fed into a hopper which has a ram weight connected to a piston rod for controlling movement of the materials into the mixer. The hopper is closed except when the ingredients are being loaded.

BACKGROUND ART

Internal mixers of a 8.36 cubic feet (237 liter) size such as a that shown in U.S. Pat. No. 5,492,403 have been made and operated in rubber plants for many years. The mixer body has had a rectangular throat opening of 11.5 inches (29.21 cm) by 32 inches (81.28 cm), a piston-cylinder with an 11 inch diameter (27.94 cm) for operation on 100 psi, (7.03 kg/sq cm), factory supplied air pressure providing an effective stock pressure of 27.2 psi (1.91 kg/sq cm). Mixing time, that is the time required to raise the temperature of the rubber mixture from ambient (room temperature) of 80° F.–90° F. (27° C.–32° C.) to a discharge temperature of 350° F., (662° C.) has been 3.5 to four minutes. Loading time has taken from one to several minutes.

The mixer body has been replaced approximately every seven years because of wear in the throat area and inside the mixer body. Complete replacement of these 237 liter mixers with new larger mixers has not been feasible in older rubber plants because of the increased weight of the new mixers which would require extensive changes to the rubber plant. Also the cost of new mixers and other equipment for the larger size mixer is substantial. [$2,200,000 for a new 8.36 cubic foot (270 liter) mixer assembly].

DISCLOSURE OF INVENTION

The present invention is directed to a modification of the present 8.36 cubic feet (237 liter) size internal mixer which does not require enlarging the size of the mixer body. By increasing the size of the throat of the mixer body, adding a new size ram weight and hopper and a new size piston-cylinder apparatus, substantial improvements in production and quality have been achieved. Also, by adding wear plates at the throat area, the time between replacements of the mixer body has been increased.

In accordance with one aspect of the invention there is provided: an internal mixer for mixing petrochemical materials and other ingredients to be vulcanized comprising a mixer body, a mixing chamber in the body, a throat opening for charging the mixer, a discharge opening for discharging the mixer, a ram weight, a hopper and a piston-cylinder assembly for urging the ram weight into the throat opening and applying pressure to the petrochemical materials and other ingredients in the mixing chamber characterized by the mixing chamber having a volume not over 8.36 cubic feet (237 liters), the throat opening having an area of at least 576 square inches (3,715 cm$^2$), the hopper having a cross sectional area of at least 576 square inches and the ram having an area of at least 576 square inches (3,715 cm$^2$).

DETAILED DESCRIPTION OF THE INVENTION

Figure 1:
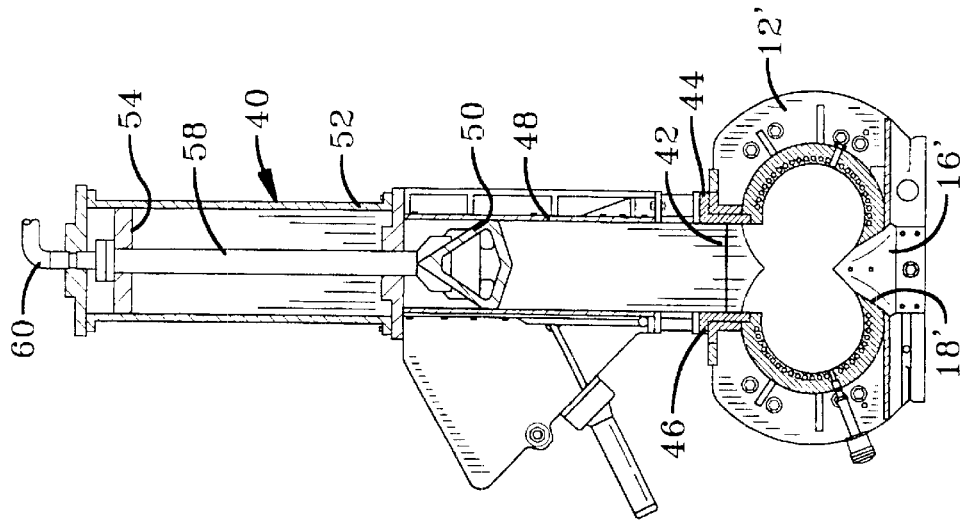
FIG. 1 is a fragmentary sectional view of a prior art internal mixer assembly.

Referring to FIG. 1, a prior art internal mixer assembly 10 is shown having a mixer body 12 with a mixing chamber 14 having a capacity of 8.36 cubic feet (237 liters). A door 16 (shown in the closed condition) is provided to close a discharge opening 18 in the mixer body 12. A throat 20 is provided in an upper wall 22 of the mixer body for receiving the ingredients to be mixed from a hopper 24 mounted on the upper wall 22 of the mixer body 12. A piston-cylinder assembly 26 is mounted on the hopper 24 with a piston 28 fastened to a piston rod 30 connected to a ram weight 32 located in the hopper 24.

In this prior art internal mixer assembly 10 the throat 20 in the mixer body 12 has an opening having a width of 11½ inches (29.21 cm) and a length of 32 inches (81.28 cm) or a total area of 368 square inches (2,373.65 sq cm). The ram weight 32 and the hopper 24 are of substantially the same size for movement of the ram weight into the throat 20 during operation of this internal mixer assembly 10.

The piston-cylinder assembly 26 has an air inlet pipe 34 in communication with a supply of air pressure from the factory which may be 100 psi (7.03 kg/sq cm). The diameter of the piston 28 is 11 inches (27.94 cm) and is slidably mounted in a cylinder 36 of the piston-cylinder assembly 26. The cylinder 36 also has a diameter of 11 inches (27.94 cm). A loading door 38 is hinged in the hopper 24 and is movable to an open position not shown for adding ingredients to the hopper.

Figure 2:
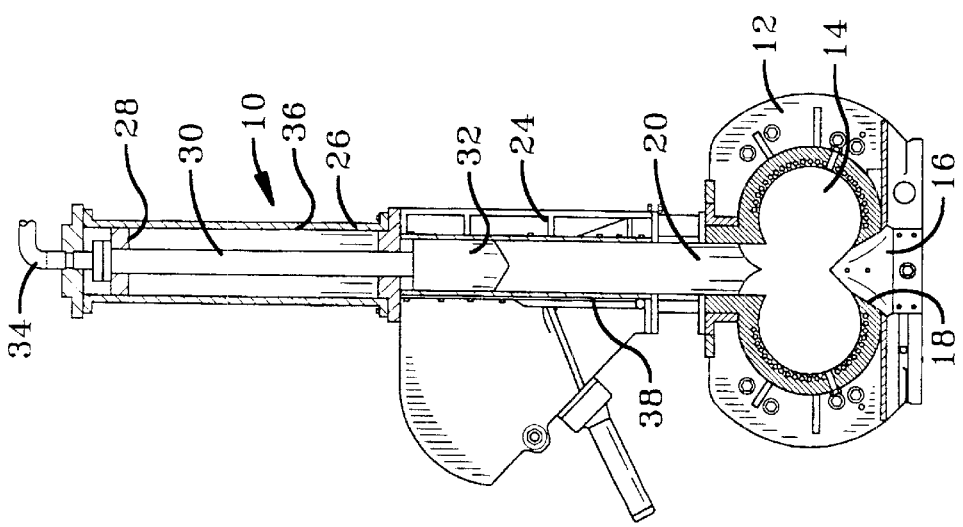
FIG. 2 is a fragmentary sectional view of the internal mixer having the same size mixer body as the mixer of FIG. 1 and the wide throat and other improvements embodying the present invention.
Figure 3:
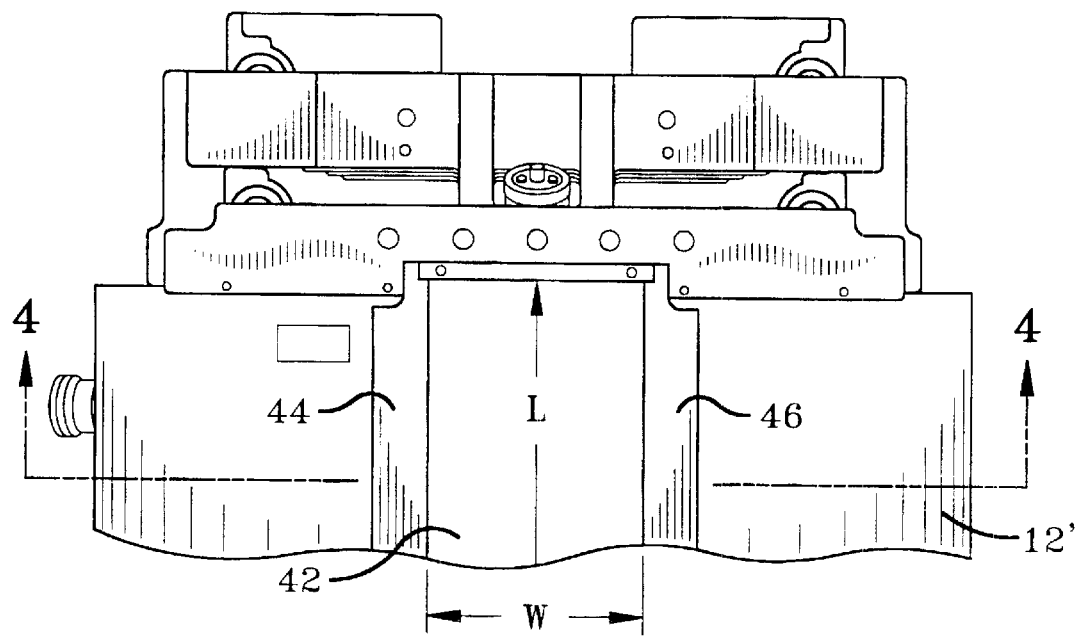
FIG. 3 is an enlarged fragmentary plan view of the mixer body taken along line 3—3 in FIG. 2 showing the wide throat and wear plates.
Figure 4:
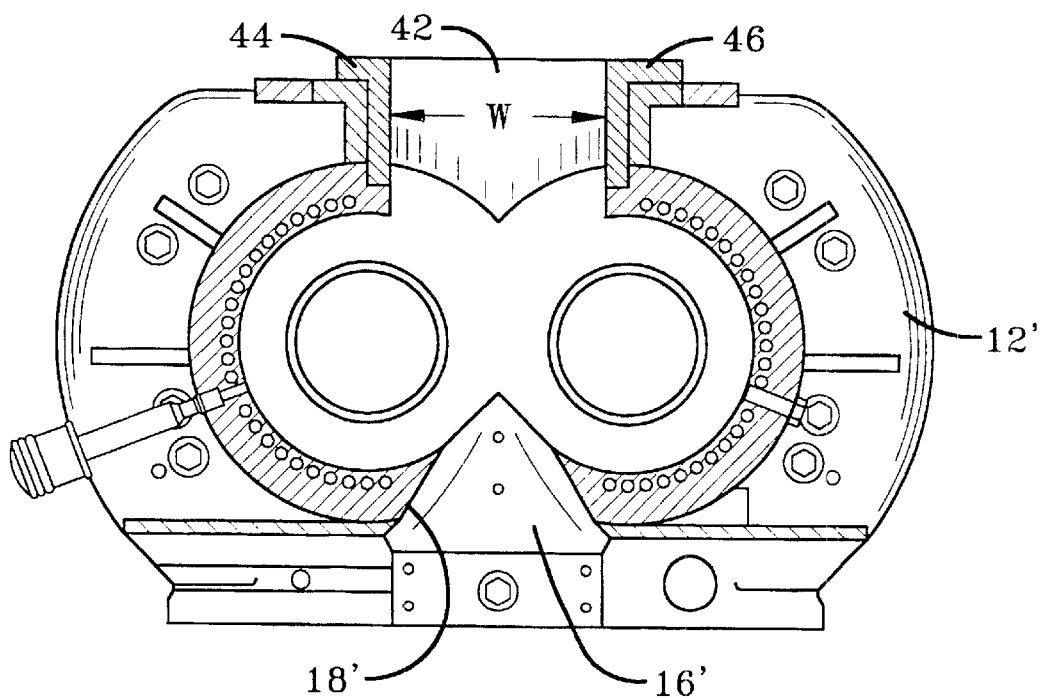
FIG. 4 is a sectional view of the mixer body showing the throat and wear plates taken along line 4—4 in FIG. 3.

With reference to FIG. 2, an internal mixer assembly 40 is shown embodying the invention wherein the mixer body 12' is the same as the mixer body 12 of the prior art internal mixer assembly 10, except a new throat opening 42 has a width w of 18 inches (45.72 cm) and a length of 32 inches (81.28 cm). This provides an area of 576 square inches (3,715 sq cm) in contrast to the area of the throat 20 of the prior art assembly 10, which is 368 square inches (2,378.60 sq cm). The new throat opening 42 also has wear plates 44 and 46 covering the side surfaces of the opening.

Mounted on the mixer body 12' is a hopper 48 containing a ram weight 50. The ram weight 50 is sized to fit in the new throat opening 42 and has a width of 17.625 inches (44.76 cm) and a length of 31.625 inches (80.32 cm), providing enough clearance to slide into the new throat opening. Mounted on the hopper 48 is a piston-cylinder assembly 52 having a piston 54 slidably in mounted in a cylinder 56 with a piston rod 58 connected to the ram weight 50. A pipe 60 in communication with the cylinder 56 and a source of factory air is also provided at the top of the cylinder 56. The piston and cylinder have a diameter of 22 inches (55.88 cm) and the factory supply of air pressure may be around 79 psi (5.55 kg/sq cm). A loading door 62 may be hinged in the side of the hopper 48 and is movable to an open position not shown for adding ingredients to the hopper.

The wear plates 44 and 46 of the new throat opening 42 are of a material such as heat tempered steel plate having a 55–60 Rockwell hardness which is of greater hardness than the cast steel material of the ram weight 50. This results in the ram weight 50 wearing out sooner than the wear plates 44 and 46 at the throat 42 of the mixer body 12'. With this construction there is a savings in the replacement of worn parts since it is less costly to replace the ram weight 50 than the mixer body 12'.

In operation it has been found that substantial improvements in production and quality of the mixing have been achieved with the new internal mixer assembly 40. In loading the mixer 40, bales of petrochemicals, such as natural rubber, are fed into the throat openings 20 and 42. These bales have one side of 11.5 inches by 32 inches (29.21 cm by 81.28 cm) and it has been found that because of the wider throat opening of the new internal mixer assembly 40 there is an improvement in loading which can be done automatically in 45 seconds for each charge. Other ingredients which are mixed in with the petrochemicals are paraffins, carbon black in powder or granule form and process oils which may be heated in liquid form. With the new internal mixer assembly 40 it has been found that the dispersion of the carbon black and heated oils in the mixed product over the dispersion in the mixture produced by the prior art mixer assembly 10 is much improved. This has been determined by examining the product for dispersion under magnification.

The new internal mixer assembly 40 provides mixing under an effective stock pressure of 54 psi (3.94 kg/sq cm). This is compared with an effective stock pressure of 27.2 psi (1.91 kg/sq cm) for the prior art internal mixer assembly 10. Effective stock pressure is the product of the pressure in the cylinder 26 and the face area of the piston 54 divided by the ram weight 50. The mixing time has also been reduced to 1.5 minutes from 3.5 to 4 minutes necessary with the prior art internal mixing assembly 10. The mixing time is determined by the time required to increase the temperature from the feeding temperature, or ambient (room) temperature of 80° to 90° Fahrenheit (270 to 32° C.) to a discharge temperature of 350° F. (177° C.). It is believed the rapid increase in temperature is due to the increased size of the ram weight 50 and the pressure exerted by the ram weight on the batch of rubber in the mixer chamber 14'. After the batch of rubber is mixed, the door 16' is opened to discharge the batch from the mixing chamber 14'. With the new internal mixer assembly 40 the loading time has been reduced to 45 seconds from the 1 to several minutes with the prior art mixer assembly 10. This is a substantial savings in a 24 hour period of continuous operation.

From these test results it has been demonstrated that without any substantial change to the mixer body 12 substantial improvements in production and quality can be obtained. This has resulted in large savings in not having to buy new and larger equipment and redesigning factory space for the larger equipment. Before this invention, larger internal mixers were designed and made with 9.53 cubic feet (270 liter) volumes, whereas the new internal mixer assembly 40 makes this economically unnecessary at this time.

While certain representative embodiments and details have been shown for the purpose of illustrating the invention, it will be apparent to those skilled in the art that various changes and modifications may be made therein without departing from the scope of the invention. Having thus described the invention, it is now claimed:

We claim:

1. An internal mixer (46) for mixing petrochemical materials and other ingredients comprising a mixer body, a mixing chamber (14) in said body, a throat opening (42) for charging said mixer, a discharge opening (18') for discharging said mixer, a ram weight (50), a hopper (48) and a piston-cylinder assembly (52) for urging said ram weight (50) into said throat opening (42) and applying pressure to said petrochemical materials and said other ingredients in said mixing chamber (14), said mixing chamber (14) having a volume not over 8.36 cubic feet (237 liters), characterized by said throat opening (42) having an area of at least 576 square inches (3.715 sq. cm), said hopper (48) having a cross sectional area of at least 576 square inches (3.715 sq. cm), and said ram weight (50) having an area of at least 576 square inches (3.715 sq. cm).

2. The internal mixer (40) of claim 1 further characterized by each of said throat opening (42) and said ram weight (50) being about 18 inches (45.72 cm) wide and about 32 inches (81.28 cm) long.

3. The internal mixer (40) of claim 1 further characterized by said hopper (48) having a cross section size of at least 18 inches wide (45.72 cm) and 32 inches long (81.28 cm).

4. The internal mixer (12') of claim 1 further characterized by said piston-cylinder assembly (52) having a piston (54) and cylinder (56) diameter of at least 22 inches (55.88 cm).

5. The internal mixer (40) of claim 4 further characterized by said piston-cylinder assembly (52) being in communication with a source of factory air pressure of at least 79 psi (5.55 kg/sq cm) whereby effective stock pressure in said mixing chamber (12') will be at least 54 psi (3.94 kg/sq cm).

6. The internal mixer (40) of claim 1 further characterized by said throat opening in said mixing chamber being covered with wear plates of a material of greater hardness than the material of said ram weight to increase the wear life of said throat opening and said mixing chamber.

7. A method of mixing a batch of petrochemical materials and other ingredients in an internal mixer (40) having a mixing chamber with a volume of 8.36 cubic ft (237 liters), and a mixer body throat opening (42), a discharge opening (18'), a feed hopper (48) mounted on said mixer (40) over said throat opening (42), a ram weight (50) in said hopper (48) connected to a piston rod (58) of a piston-cylinder assembly (52) mounted on said hopper (48) comprising:

a. feeding said batch of petrochemical materials in the form of bales and said other ingredients into said hopper (48) and through said throat opening (42); characterized by:

b. moving said ram weight (50) into said throat opening (42) with said throat opening (42) having a width of 18 inches (45.72 cm) and a length of 32 inches (81.28 cm) to provide an effective stock pressure of about 54 psi (3.94 kg/sq cm) with a pressure in said piston cylinder assembly (52) of about 79 psi (5.55 kg/sq cm);

c. mixing said batch at said effective stock pressure until the temperature is raised to a predetermined discharge temperature; and d. discharging said batch from said mixing chamber (14') through said discharge opening (18').

8. The method of claim 7 further characterized by bales of petrochemicals having one side smaller than said mixer body throat opening (18').

9. The method of claim 8 further characterized by said one side of said bales being not over 11.5 inches by 32 inches (29.21 cm by 81.28 cm).

10. The method of claim 8 further characterized by mixing said batch until the temperature is raised to a discharge temperature of about 350 degrees F. (177 degrees C.).

11. The method of claim 7 further characterized by said ram weight (50) having an area substantially the same as the area of said throat opening (42) to provide effective stock pressure and accelerate the increase in temperature of said batch during said mixing.

* * * * *